United States Patent
Ljungqvist et al.

(10) Patent No.: US 12,448,000 B2
(45) Date of Patent: Oct. 21, 2025

(54) METHOD OF RECONSTRUCTING A VEHICLE TRAJECTORY

(71) Applicant: Volvo Autonomous Solutions AB, Gothenburg (SE)

(72) Inventors: Oskar Ljungqvist, Sätila (SE); Robert Hult, Torslanda (SE); Oskar Wigström, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 520 days.

(21) Appl. No.: 17/806,858

(22) Filed: Jun. 14, 2022

(65) Prior Publication Data
US 2022/0402523 A1   Dec. 22, 2022

(30) Foreign Application Priority Data

Jun. 17, 2021   (EP) ..................................... 21180047

(51) Int. Cl.
*B60W 60/00* (2020.01)
*B60W 10/20* (2006.01)
(Continued)

(52) U.S. Cl.
CPC ........ *B60W 60/0011* (2020.02); *B60W 10/20* (2013.01); *B60W 30/10* (2013.01);
(Continued)

(58) Field of Classification Search
CPC ......... B60W 10/20; B60W 2050/0013; B60W 2300/145; B60W 2520/105;
(Continued)

(56) References Cited

U.S. PATENT DOCUMENTS

| 10,379,538 B1 | 8/2019 | Sheckells et al. |
| 2018/0356819 A1 | 12/2018 | Mahabadi et al. |

(Continued)

FOREIGN PATENT DOCUMENTS

WO   2019204296 A1   10/2019

OTHER PUBLICATIONS

European Communication pursuant to Article 94(3) EPC dated Jul. 30, 2024 in corresponding European Patent Application No. 21180047.9, 4 pages.

(Continued)

*Primary Examiner* — Charles J Han
(74) *Attorney, Agent, or Firm* — Venable LLP; Jeffri A. Kaminski (57) ABSTRACT

A method for generating a vehicle trajectory by optimizing a performance measure J. The trajectory may include a sequence of states $x=(x_k)_{k=1}^N$ of the vehicle. The optimization is subject to predefined vehicle dynamics $x_{k+1}=f(x_k, u_k)$, where $u_k$ is a control input to the vehicle, and a condition that each position of the vehicle shall be close to a reference path $X^r$. The vehicle's position is constrained inside a variable-width corridor around the reference path. A quantity r controlling the width of the corridor is included as an additional optimization variable and the performance measure includes a penalty on the corridor width. To define the corridor, each point of the reference path may be associated with a pair of laterally spaced ellipses and requiring each vehicle position to be outside the ellipses.

17 Claims, 4 Drawing Sheets

(51) Int. Cl.
  *B60W 30/10* (2006.01)
  *B60W 40/06* (2012.01)
  *B60W 50/14* (2020.01)

(52) U.S. Cl.
  CPC ............ *B60W 40/06* (2013.01); *B60W 50/14* (2013.01); *B60W 2300/145* (2013.01); *B60W 2520/105* (2013.01); *B60W 2520/125* (2013.01); *B60W 2540/18* (2013.01); *B60W 2552/15* (2020.02); *B60W 2552/30* (2020.02)

(58) Field of Classification Search
  CPC ....... B60W 2520/125; B60W 2540/18; B60W 2552/15; B60W 2552/30; B60W 30/10; B60W 40/06; B60W 50/14; B60W 60/001
  See application file for complete search history.

(56) References Cited

U.S. PATENT DOCUMENTS

2020/0142417 A1\* 5/2020 Hudecek ........... B60W 30/0953
2020/0341476 A1\* 10/2020 Wuthishuwong ...... G08G 1/167

OTHER PUBLICATIONS

Marcus Lundberg; "Path planning for autonomous vehicles using clothoid based smoothing of A\* generated paths and optimal control"; Degree Project in Mathematics; Stockholm, Sweden 2017; KTH Royal Institute of Technology School of Engineering Sciences; URL: www.kth.se/sci (62 pages).

Pedro F. Lima; "Optimization-Based Motion Planning and Model Predictive Control for Autonomous Driving"; With Experimental Evaluation on a Heavy-Duty Construction Truck; Doctoral Thesis; Stockholm, Sweden 2018; KTH Royal Institute of Technology School of Electrical Engineering and Computer Science Department of Automatic Control; ISBN 978-91-7729-888-5 (187 pages).

Anda Zhang; "Optimal Path Smoothing using Clothoids for Autonomous Vehicles in the Quarry Environment"; Degree Projects in Optimization and Systems Theory; Degree Programme in Applied and Computational Mathematics; KTH Royal Institute of Technology School of Engineering Sciences year 2017; Stockholm, Sweden; URL: www.kth.se/sci (62 pages).

Extended European Search Report in corresponding European Application No. 21180047.9 dated Dec. 15, 2021 (9 pages).

\* cited by examiner

METHOD OF RECONSTRUCTING A VEHICLE TRAJECTORY

TECHNICAL FIELD

The present disclosure relates to the field of vehicle control, including autonomous vehicle control and automated transport solutions. In particular, it proposes a method for generating a trajectory of a vehicle with arbitrary dynamics, such that the vehicle's position traces a reference path or stays close to this.

BACKGROUND

In the field of autonomous vehicles, the problem of fitting a trajectory to a reference path in such manner that the trajectory is feasible by a specific vehicle (reconstruction problem) has been analyzed scientifically for decades. These efforts have been motivated by the frequently encountered use case of automating transportation in ports, terminals, warehouses, mines and similar closed environments, where autonomous vehicles circulate along recorded paths that correspond to pre-specified static routes. A closed environment in this sense may be one where the occurrence of pedestrians and other traffic is controlled or absent. The task of recording the paths, conventionally entrusted to a human operator, is often time-consuming and error-prone as a result of inaccurate maneuvering, road-surface irregularities, wind drag and other aleatory factors. Moreover, if the static route is to be used in a range of different weather conditions and by a variety of different vehicles and vehicle configurations, it may be necessary to record multiple paths for each route. Therefore, the availability of an automated on-demand method that produces a feasible trajectory which fits a single recorded reference path is of evident economic value.

A trajectory with bounded and continuously varying curvature is, generally speaking, feasible. This condition is fulfilled, for example, by a trajectory composed of continuously clothoid segments patched in a continuity-preserving way. In addition to the theoretical aspects of the trajectory-fitting problem, various computational considerations need to be addressed. Attempts have been made to formulate the trajectory fitting as an optimization problem which lends itself to efficient numerical solving.

For example, M. Lundberg, "Path planning for autonomous vehicles using clothoid based smoothing of A* generated paths and optimal control", degree project report, KTH (2017) discloses a solution for a path planning problem for a non-holonomic autonomous load carrier for quarry environments.

Further, P. F. Lima, "Optimization-Based Motion Planning and Model Predictive Control for Autonomous Driving", PhD thesis, KTH (2018) discloses a clothoid-based path sparsification algorithm for generating a trajectory that follows a reference path, wherein said trajectory is generated using a convex optimization format taking into account vehicle dimensions. The path sparsification algorithm produces a sparseness regularization which aims to minimize the number of patching segments.

Further still, A. Zhang, "Optimal Path Smoothing using Clothoids for Autonomous Vehicles in the Quarry Environment", degree project report, KTH (2017) presents a path-smoothing technique, which optimizes a sequence of parametrized curves (clothoids) to smoothen an input path into a feasible trajectory. The method has been successfully used on a rigid electric road carrier and has proved to enhance the system's performance as the path is smoothened, thereby making it easier for the motion controller to follow. The optimization problem takes the form of an optimal control problem, which is accompanied by circular constraints around the reference positions of the vehicle, into which the trajectory is restricted, so that it is close to the reference path where this is important. Once the problem has been solved, if any trajectory points lie on the boundary of the circular constraints, those points are associated with reference samples if possible, and the problem is solved anew. The process continues iteratively. Zhang's solution is limited to vehicles without trailers and which are operating at low speeds in undisturbed driving conditions. Therefore, this method is not scalable to more complex systems. In the particular case of a tractor-semitrailer combination, it would not be possible to account for the trailer's path during the optimization. Moreover, the disclosed implementation does not allow the vehicle dynamics to be updated as a function of, say, weather and road-surface conditions.

SUMMARY

It is an objective of the present disclosure to provide methods and devices for fitting a vehicle trajectory to a reference path for configurable vehicle dynamics. It is a further objective to make such methods and devices available that produce a well-conditioned optimization problem, one which lends itself to efficient and robust numerical solving. In such methods and devices, it is desirable to use an optimization process that executes independently of any discrete representation in which the reference path is provided. It is a still further object to propose methods and devices suited for use with fully or partially autonomous vehicles.

At least some of these objects are achieved by the invention as defined in the independent claims. The dependent claims relate to advantageous embodiments of the invention.

In a first aspect of the invention, there is provided a method of generating a vehicle trajectory by optimizing a performance measure J. The trajectory may include a sequence of states $x=(x_k)_{k=1}^N$ of the vehicle. The optimization can be carried out subject to any user-defined vehicle dynamics $x_{k+1}=f(x_k, u_k)$, where $u_k$ is a control input to the vehicle, and under a condition that each position of the vehicle, $X_k=h(x_k,u_k)$, shall be close to a reference path $X^r=(X_l^r)_{l=1}^M$. The reference path $X^r$ is an input to the method and it may be understood as a fixed quantity for the duration of one execution of the method. According to the first aspect of the invention, a variable-width corridor is defined around the reference path $X^r$ and the vehicle's position is constrained inside the corridor. The corridor is defined independently of the environment of the vehicle and need not correspond to any pre-existing drivable area, such as a road lane, nor to natural or artificial obstacles to the vehicle's movements. The corridor width may be locally variable, i.e., it can vary along the reference path $X^r$. A quantity $r=(r_l)_{l=1}^M$ controlling the width of the corridor is included as an additional optimization variable—i.e., in addition to x and u, if any—and the performance measure includes a penalty on the corridor width. The penalty may be a function of a collective measure of the corridor width, such as the mean, median or maximum.

(Remarks on notation: In the present disclosure, scalars and vectors representing states and control inputs of the vehicle are respectively denoted by lowercase roman letters, $x_k$ and $u_k$. A two- or three-dimensional vector representing a spatial position of the vehicle is denoted by a boldface uppercase letter, $X_k$. The symbol $(\alpha_k)_{k=1}^N$ is occasionally used to denote the sequence $\alpha_1, \alpha_2, \alpha_3, \ldots, \alpha_N$.)

By constraining the vehicle's position into a corridor with controllable width and assigning a penalty on the corridor width, the generated position trajectory $X=(X_k)_{k=1}^N$, where $X_k=h(x_k, u_k)$, is guided towards the reference path without introducing detrimental artefacts into the optimization of the performance measure J. The proposed formulation is flexible in that a variety of optimization solvers can be used to solve the optimization problem numerically, so that good computational efficiency can be expected in the majority of important use cases. Because the position trajectory is guided towards the reference path, the vehicle's position will be closer to the reference path the longer the optimization is allowed to execute. It is emphasized that reaching optimality is not essential for the present invention; the optimization may rather be understood as a process which tends to improve the performance measure iteratively and which is allowed to execute for as long as a preset computational budget permits.

Another advantage is that the present invention avoids the association problem seen in the existing solution (Zhang) discussed above.

Moreover, because the corridor-width controlling quantity $r=(r_l)_{l=1}^M$ is included as an optimization variable (decision variable) in the method, the optimization will allows a dynamic and locally variable balance to establish between the tracking of the reference path on the one hand and the smoothness of the trajectory (or position trajectory) on the other hand.

In some embodiments, the corridor is delimited laterally by associating each point $X_l^r$ of the reference path with a pair of ellipses with variable radius $r=(r_l)_{l=1}^M$ and requiring each vehicle position $X_k$ to be outside the ellipses. A circle is an ellipse with equal major and minor axes. In this embodiment, the ellipse radius is the above-introduced quantity defining the width of the corridor and the ellipses are spaced apart. The condition that the position shall be outside the ellipses can be expressed algebraically as quadratic constraints on the optimization problem.

In some embodiments, a numerical memoryful optimization solver is used, and the trajectory of the vehicle is initialized such that the position trajectory is inside the corridor. As used herein, an optimization solver may be memoryful in the sense that the first iteration is based on the initial trajectory, the second iteration is based on the trajectory output by the first iteration, and so forth. This fact combined with a theoretical result (homotopic equivalence) applicable for a large class of memoryful optimization solvers ensures that the trajectory remains trapped inside the homotopy in which it was initialized. Examples of numerical memoryful optimization solvers include gradient-based optimization solvers (including hessian-based solvers), as well as some types of gradient-free solvers. When the width of the corridor decreases, the optimized position trajectory X will follow the reference path $X^r$ even more closely.

In some embodiments, the sequence of states $x=(x_k)_{k=1}^N$ is generated by optimizing the performance measure J. Then, after the sequence of states has been completely generated, the vehicle is controlled on the basis of the sequence of states. For example, a sequence of control inputs $u=(u_k)_{k=1}^N$ directed to actuators in the vehicle can be generated on the basis of the sequence of states. In these embodiments, the penalty on the corridor width may be enforced collectively for the full corridor, rather than in a pointwise fashion. For example, the penalty may depend on a total or average corridor width, so that if a tentative corridor has local deviations from a required corridor width, these deviations contribute to the total penalty but do not disqualify the corridor as a whole.

These embodiments are suitable for being executed offline and/or executed not at runtime. This is to say, according to these embodiments, the method is not performed while the vehicle is moving according to the generated sequence of states x (although the vehicle may be moving according to a different sequence of states x' during the generating of the new sequence of states x according to the method). Advantageously, this allows the sequence of states x to be generated with more forethought, possibly avoiding the scenario that locally optimal geometric features lead to a suboptimal performance of the vehicle trajectory as a whole.

In some embodiments, the reference path $X^r$ is provided by recording positions of a vehicle in operation, wherein the positions may be captured by sensors or estimated (filtered) from sensor signals. In other embodiments, the reference path $X^r$ is defined offline, e.g., by means of an operator interface, which may be vehicle-carried or vehicle-independent.

In a second aspect of the present invention, there is provided a device for generating a vehicle trajectory by optimization. The device comprises processing circuitry configured to execute the method described above.

The second aspect shares the advantages of the first aspect. It can be implemented with an equivalent degree of technical variation.

The invention further relates to a computer program containing instructions for causing a computer to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
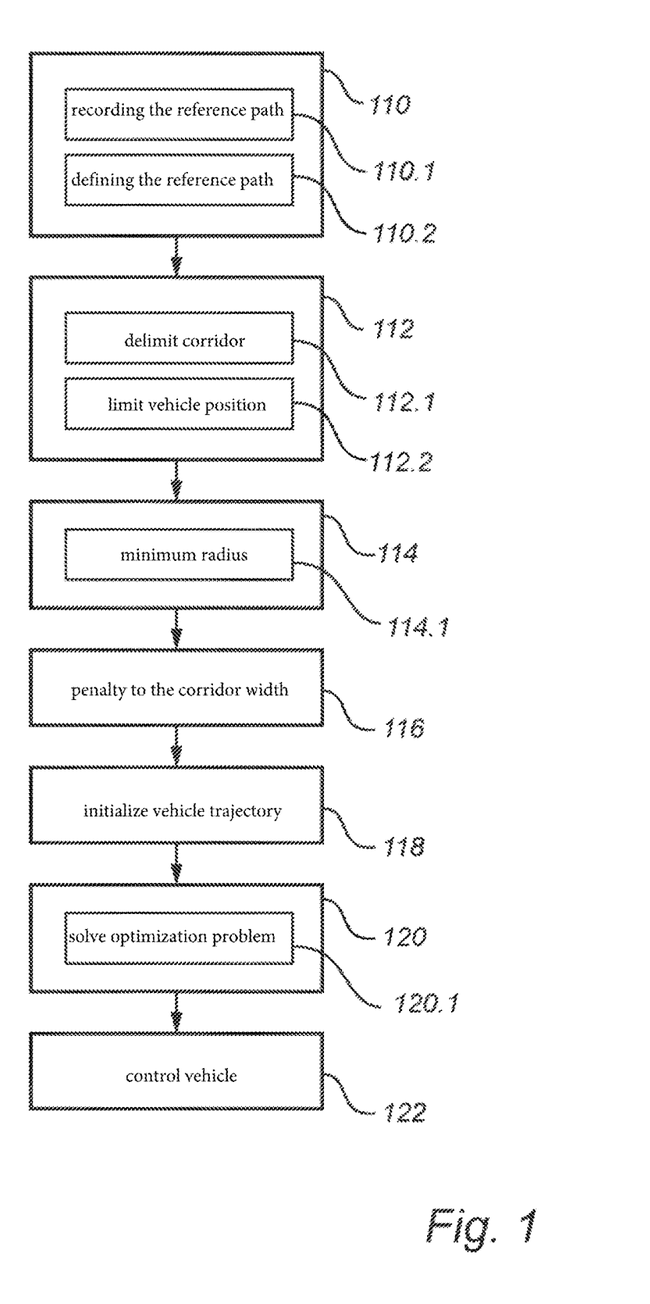
FIG. 1 is a flowchart of a method for generating a vehicle trajectory.

With reference to FIG. 1, there will now be described a method 100 for generating a vehicle trajectory x on the basis of a reference path $X^r = (X_l^r)_{l=1}^M$. The vehicle is modeled as a dynamical system which, in this example, is described in discrete time, wherein physical (continuous) time is segmented into epochs of equal duration which are represented by values of a discrete variable k. The model includes a definition of a state $x_k$, a control input $u_k$, vehicle dynamics $x_{k+1} = f(x_k, u_k)$ and a position operator h which maps each state $x_k$ to a position $X_k$. The position operator h may optionally depend on the control input $u_k$ and it may optionally output a further quantity, such as the vehicle's heading. The vehicle dynamics $f$ may be represented by a linear or nonlinear function; the vehicle dynamics $f$ may in particular be non-holonomic. The state $x_k$ comprises relevant aspects of the vehicle's current condition. It may be composed of the vehicle's position, orientation, speed or another kinematic quantity, and may further comprise internal parameters such as steering angle, articulation angle (of a vehicle combination) and other conditions prevailing in a technical system in the vehicle, including the drivetrain. Similarly, a control input $u_k$ may represent a momentary actuation of a technical system in the vehicle, including accelerating, braking, increasing/decreasing a steering angle.

Accordingly, the trajectory may comprise a sequence $x = (x_k)_{k=1}^N$ of states $x_k$ of the vehicle. From this, a position trajectory $X = (X_k)_{k=1}^N$, where $X_k = h(x_k, u_k)$, can be derived using the position operator h. As will be explained in detail below, the trajectory is generated by optimizing a performance measure J, which is a function of the sequence x of states and optionally of the control inputs u. The performance measure J may depend on one or more of:

- mission duration, which may be measured as the time needed to complete a representative utility task,
- a safety indicator, such as a collision probability, minimum vehicle separation, dwelling time in share sites such as intersections, etc.,
- trajectory smoothness and position trajectory smoothness, as measured by peak rate of change, total variation, continuity of derivatives and similar metrics,
- deviation from the reference path $X^r$,
- steering angle rate, lateral or longitudinal jerk, lateral or longitudinal acceleration, wherein the peak or average values may be indicative of the degree of mechanical wear on the vehicle.

The performance measure J, just like the vehicle dynamics $f$, may further depend on at least one environment factor. This may be used to express that a different driving behavior may be preferred in poor visibility, frost, wind, or when temporary regulations (e.g., roadworks) are in force. This also underlines the importance of being able to regenerate the trajectory conveniently.

Figure 2:
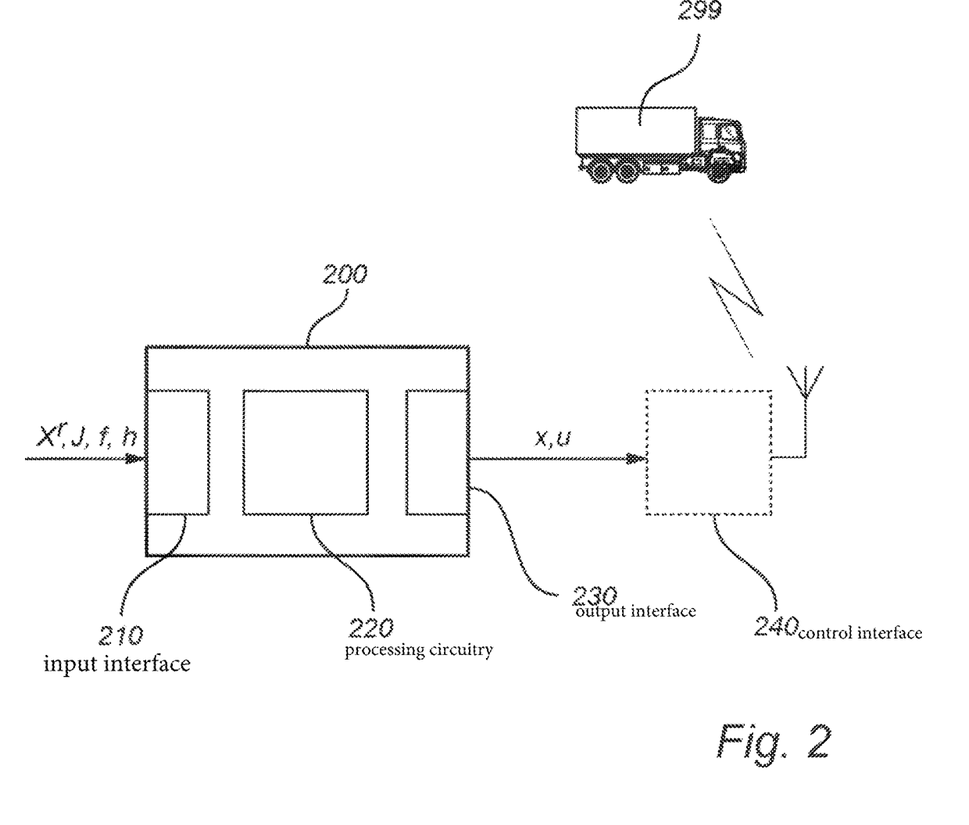
FIG. 2 is a device for generating a vehicle trajectory, coupled to an optional control interface for exchanging instructions and sensor data with a vehicle.

The method 100 may be implemented in an onboard or offboard system. In particular, the method 100 may be carried out by the device 200 shown in FIG. 2, which comprises an input interface 210, processing circuitry 220 and an output interface 230. The input interface 210 is configured to receive parameters specifying the optimization problem to be solved, such as the reference path $X^r$, performance measure J, as well as vehicle dynamics $f$ and a position operator h relating to a vehicle 299 which is to execute the generated trajectory x. The vehicle 299 may be rigid or may constitute a vehicle combination with two or more units. The trajectory x and control inputs u are provided at the output interface 230. In FIG. 2, the device 200 provides its output to a control interface 240 configured to forward at least the sequence of control inputs u to the vehicle 299, e.g., using a wireless transceiver. If the vehicle 299 is autonomous, the control inputs u may be applied directly to technical systems therein. Alternatively, if the vehicle 299 is at least in part conventionally maneuvered, the control inputs u may be presented in human-intelligible form (e.g., on a driver display, by audio) or may be applied to a driver assistance system (e.g., haptic steering-wheel assistance). During execution, the control interface 240 or circuitry in the vehicle 299 may verify that the vehicle's 299 actual state evolves approximately according to the sequence x.

In a first step 110 of the method 100, the reference path $X^r$ is provided. This may be performed by recording 110.1 the reference path $X^r$ as a sequence of sensed positions of an operating vehicle. The vehicle which is used for the recording need not be the same the vehicle as that for which the method 100 is performed. Indeed, it is one of the objectives of the present disclosure to be able to generate a trajectory from a reference path using freely configurable vehicle dynamics. The reference path can be recorded directly in the form of positions $X_k^r$ or in the form of states $x_k$ (and control inputs $u_k$) of the recording vehicle, which can be converted into positions by $X_k^r = h(x_k, u_k)$. Alternatively, the reference path $X^r$ is defined 110.2 using an operator interface, e.g., using a geographical information system or drawing tool.

In a second step 112 of the method 100, a constraint that the vehicle position shall be inside a corridor with variable width around the reference path $X^r$ is added to the optimization problem. The optimization problem may then be formulated, at least conceptually, as:

$$\max_{x,u} J(x, u) \quad (1)$$

subject to $$x_{k+1} = f(x_k, u_k) \quad (2)$$

$$X_k \text{ inside corridor around } X^r \text{ for all } k, \quad (3)$$

where the position $X_k=h(x_k, u_k)$ as seen above. Accordingly, the performance measure J is used as the objective function in the optimization problem. The width of the corridor may be variable, and it may vary with the value of a width-controlling quantity. The width may also be different in different segments of the corridor, that is, it may have a variation along $X^r$. It is emphasized that condition (3) is independent from the above-discussed option of letting the performance measure depend on the position trajectory's deviation from the reference path $X^r$; that option and the enforcement of condition (3) rather constitute alternative ways to achieve the common goal of fitting the trajectory to the reference path $X^r$.

Figure 6:
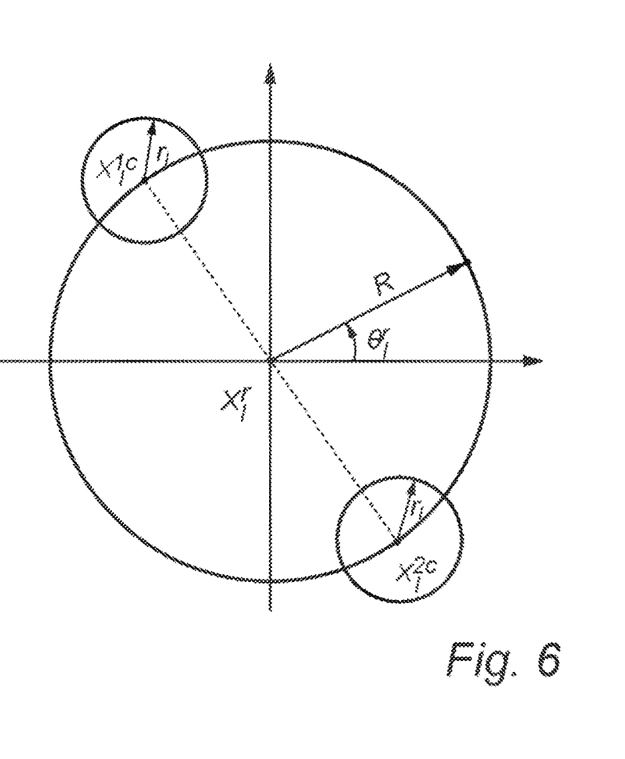
FIG. 6 illustrates a pair of circles, respectively centered at points $X_l^{1c}$ and $X_l^{2c}$, which are spaced apart by a distance 2R in directions $\theta_l^r \pm \pi/2$ as seen from a reference path point $X_l^r$.

In one embodiment, the corridor is delimited 112.1 laterally by associating each point $X_l^r$ of the reference path with a pair of ellipses with variable radius $(r_l)_{l=1}^M$ and requiring 112.2 each vehicle position $X_k$ to be outside the ellipses. The radius $r_l$ may be a scalar or a vector with two components representing the minor and major axes of each ellipse, e.g., $r_l = (r_{l,minor}, r_{l,major})$. Accordingly, when a least radius $r_{min}$ of an ellipse is enforced, both the minor and major axes are required to be greater than or equal to $r_{min}$. FIG. 6 illustrates the special case where the ellipses are circles, spaced apart by a distance 2R from the reference path point $X_l^r$ in directions normal to the momentary heading $\theta_l^r$ of the reference path. This is to say, the circles are located in directions $\sigma_l^r \pm \pi/2$ as seen from the reference path point $X_l^r$. The heading $\theta_l^r$ may be recorded as a component of the reference path (e.g., using a heading sensor), a modified position function h which computes the heading from the recorded vehicle state may be used, or the heading may be computed in a per se known manner based on a vector difference of $X_l^r$ and one or both of its adjacent reference path points $X_{l\pm1}^r$. It holds that $$X_l^{1c} = X_l^r + R \begin{bmatrix} \cos\left(\theta_l^r + \frac{\pi}{2}\right) \\ \sin\left(\theta_l^r + \frac{\pi}{2}\right) \end{bmatrix}$$

$$X_l^{2c} = X_l^r + R \begin{bmatrix} \cos\left(\theta_l^r - \frac{\pi}{2}\right) \\ \sin\left(\theta_l^r - \frac{\pi}{2}\right) \end{bmatrix}$$

With this notation, condition (3) may be formulated as $$\|X_k - X_l^{1c}\|^2 \geq r_l^2 \quad (3a)$$

$$\|X_k - X_l^{2c}\|^2 \geq r_l^2 \quad (3b)$$

for all k, l, where $\|\cdot\|$ is any suitable norm, such as $l^1$ or $l^2$ (Euclidean) norm. For $Y \in \mathbb{R}^2$, the $l^2$ norm is defined as $\|Y\|^2 = y_1^2 + y_2^2$. With this, inequalities (3a) and (3b) are quadratic if written on component form. It is optional to enforce 114.1 a least radius $r_{min}$ as per $$r_{min} \leq r_l \leq R. \quad (3c)$$

This is equivalent to a condition that the corridor width must not exceed $2(R - r_{min})$ at the level of any of the reference path points $X_l^r$.

The radius $r = (r_l)_{l=1}^M$ is included 114 as an optimization variable. This is to say, expression (1) includes a performance measure $J(x, u, r)$ which is a function of the vehicle states x, control inputs u and the radius r. More precisely, the performance measure J includes 116 a penalty to the corridor width, in the sense that the performance measure increases if the corridor is narrowed for constant x, u. If the corridor is defined according to inequalities (3a) and (3b), the performance measure may be expected to increase with an increase in $r_l$, since the prohibited circles will then occupy more lateral space and coerce the position trajectory X towards the reference path $X^r$ to a greater extent.

In a fifth step 118 of the method 100, the vehicle trajectory is initialized with an initial sequence of states $x^{(0)} = (x_k^{(0)})_{k=1}^N$ such that the vehicle position $X_k^{(0)} = h(x_k^{(0)}, u_k^{(0)})$ is inside the corridor around the reference path $X^r$. Here, if the position function h depends on the control input, the control inputs $u^{(0)} = (u_k^{(0)})_{k=1}^N$ may be initialized with neutral values, i.e., no active maneuvering is undertaken. This condition may be formulated using inequalities (3a) and (3b). It is emphasized that the discrete representations of the reference path $X^r = (X_l^r)_{l=1}^M$ and the sequence of states $x = (x_k)_{k=1}^N$ are independent; there is no necessity to synchronize the points (e.g., a pairwise correspondence between $x_k$ and $X_l^r$), nor to initialize x with the same number of states as there are reference path points (M=N).

In a sixth step 120 of the method 100, the optimization problem (1), (2), (3) or the problem (1), (2), (3a), (3b), with the optional addition of (3c), is solved. The solution includes the sequences x, u of vehicle states and control inputs. For the solving, a gradient-based solver may be used. Just like the discrete representations of the states x and the reference path $X^r$ are independent, as explained, the optimization solver is preferably configured to provide the sequence of states x independently of the individual points in $X^r$. This may mean that the position trajectory is coerced towards the reference path laterally but not longitudinally. In particular, inequalities (3a) and (3b) may be enforced collectively for all $1 \leq k \leq N$, $1 \leq l \leq M$ rather than in a pointwise fashion.

It is not essential for the present invention whether the conditions (2) and (3) are expressed as constraints in the strict sense or are included in the performance measure J. Indeed, there are well known techniques for converting a constraint into a term in the objective function; such term may be a barrier function or indicator function assigning a penalty to values violating the constraint. There are also ways to translate a component of the objective function into one or more constraints, including linearization techniques and preconditioning techniques.

In an optional further step 122 of the method 100, a vehicle 299 is controlled by applying the generated sequence of control inputs u. Optionally, the controlling may include a concurrent monitoring of the vehicle's compliance with the generated trajectory x. Preferably, the vehicle 299 has identical or approximately corresponding vehicle dynamics as those expressed by equation (2) in the optimization problem. Such correspondence will ensure that the generated trajectory can be successfully executed by the vehicle 299.

Figure 3:
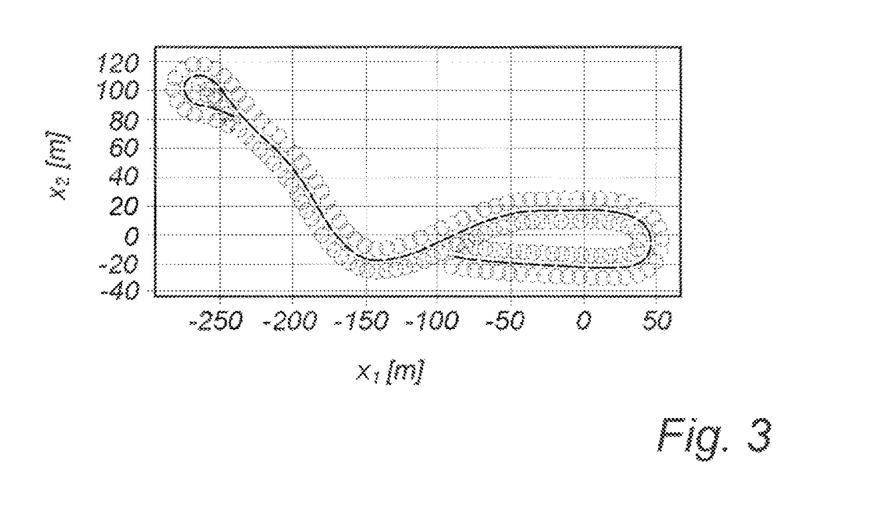
FIG. 3 illustrates a reference path, a position trajectory generated using an embodiment of the invention (which approximately coincides with the reference path), as well as sequences of circles which delimit the constraint corridor laterally.

FIG. 3 illustrates a reference path representing movement on a surface and a position trajectory which was generated, in a pilot study, by applying an embodiment of the method 100 to this reference path and applying the vehicle dynamics $f$ of a vehicle combination. FIG. 3 further shows sequences of circles which delimit the constraining corridor laterally. Here, the performance measure J is defined in such manner as to penalize the position trajectory's deviation from the reference path $X^r$, and it is seen in the figure that the resulting position trajectory approximately coincides with the reference path.

Figure 4A:
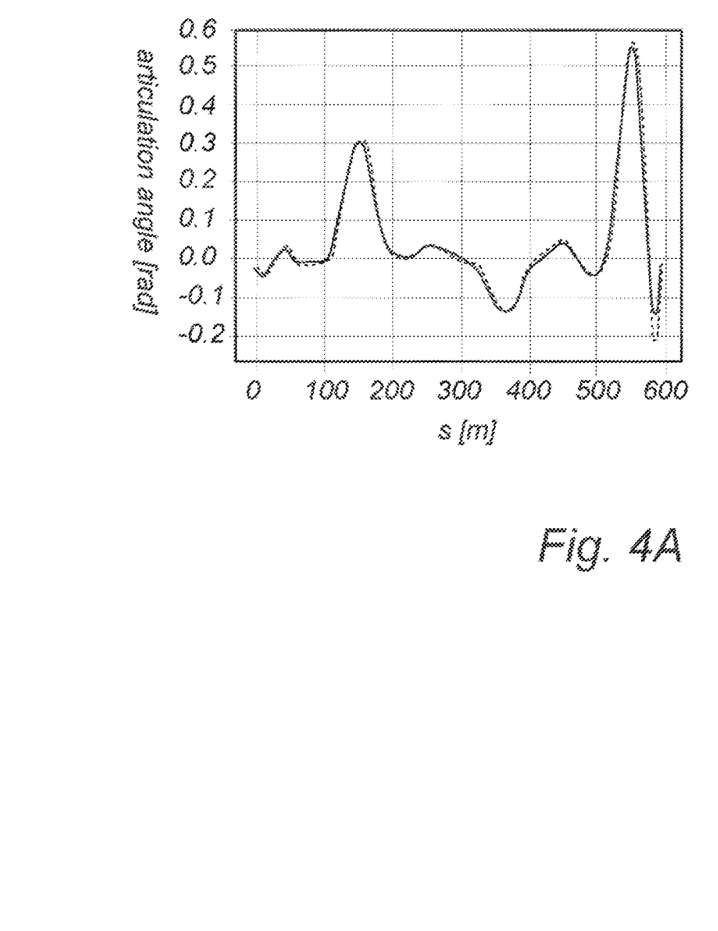
FIG. 4A is a comparison of an articulation angle sensed during the recording of a reference path and the articulation angle according to a generated vehicle trajectory.
Figure 4B:
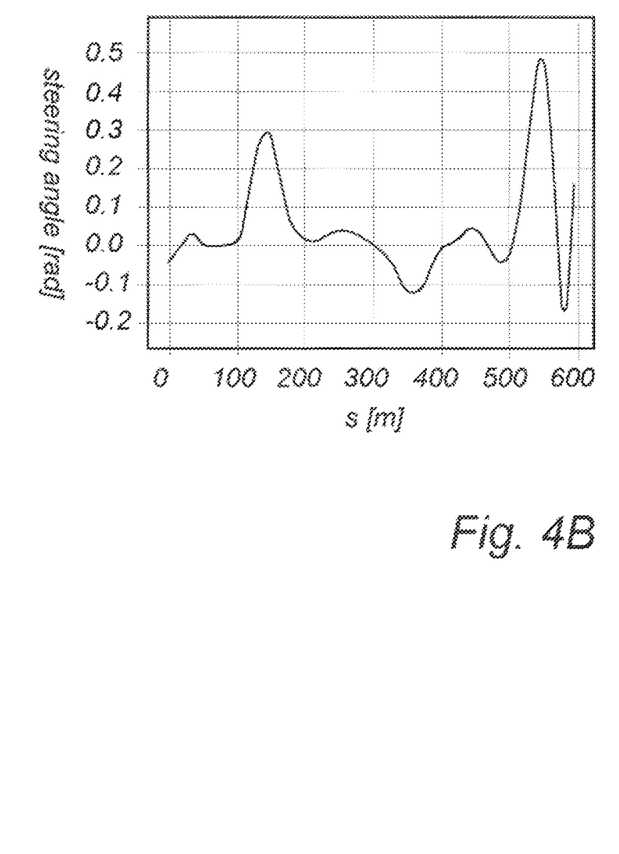
FIG. 4B shows a steering angle according to the same vehicle trajectory, which was generated on the basis of a reference path for which no steering-angle data was recorded; [and]

Still referring to the same pilot study, FIG. 4A is a comparison of the vehicle combination's articulation angle sensed during the recording of the reference path and the articulation angle according to the generated vehicle trajectory. It is noted that the angles are plotted as functions of curve length s, i.e., the vehicle's position along the path. FIG. 4B for its part shows the steering angle (again as a function of curve length) for the same vehicle trajectory. Because no steering-angle data was recorded with the reference path, no comparison like in FIG. 4A is possible. This illustrates that embodiments of the present invention may allow the reconstruction of unknown (unrecorded) vehicle states.

Figure 5:
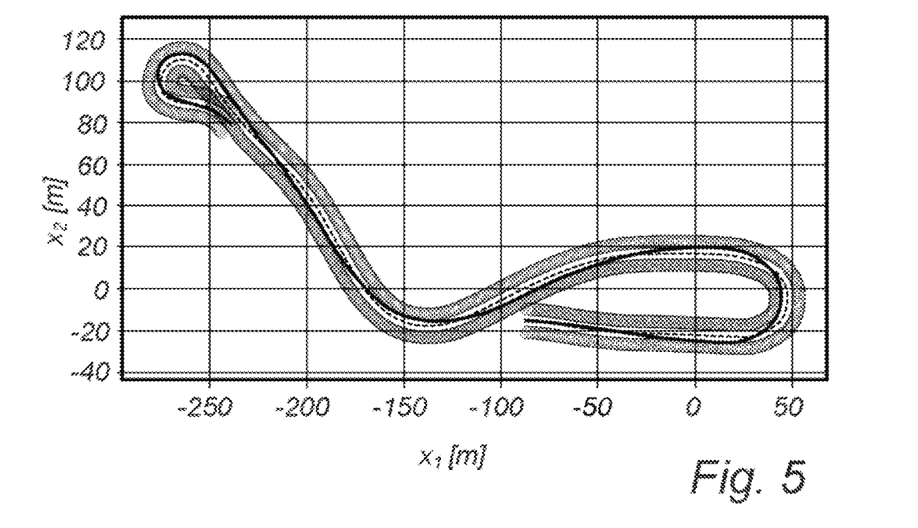
FIG. 5 illustrates, similar to FIG. 3 but for different settings, a reference path, a generated position trajectory (which deviates from the reference path, yet without departing from the corridor), as well as sequences of circles which delimit the constraint corridor laterally.

FIG. 5 illustrates, similar to FIG. 3 but for a different definition of the performance measure, a reference path, a generated position trajectory, as well as sequences of circles which delimit the constraint corridor laterally. The performance measure differs from that used in FIGS. 3-4 in that it does not award a penalty if the position trajectory deviates from the reference path $X^r$. It is seen that the position trajectory deviates locally from the reference path, yet without departing from the corridor.

The foregoing sections of the present disclosure present a method for constructing a trajectory from a recorded reference path tailored for autonomous vehicles operating in closed environments using optimizing. The method expands on certain homotopy techniques previously proposed within numerical optimal control and utilize these to compute optimized trajectories that trade-off between tracking the recorded reference paths, removing unwanted disturbances embedded in the recorded reference paths, partly modifying the reference paths and (re)constructing data not included in the recordings. The method may be used to enhance safety, increase uptime and productivity and to enable adaptation based on, e.g., different types of vehicles as well as different weather conditions. Consequently, the method has the potential to improve the overall performance of an autonomous vehicle fleet.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. The invention can be generalized to three dimensions, which may be utilized to generate a trajectory for an aerial or submarine vessel. In three dimensions, the corridor around the reference path is preferably delimited by associating each point of the reference path with a torus having variable minor radius and/or variable major radius. Just like a pair of ellipses (which may be understood as the intersection between the torus and a ground vehicle's plane of movement), the condition that the vehicle position shall be outside the tori can be expressed as a quadratic constraint in the optimization problem, which therefore remains well posed.

The invention claimed is:

1. A method of fitting a vehicle trajectory to a reference path, comprising:
    obtaining a reference path $X^r=(X_l^r)_{l=1}^{M}$, where $X_l^r$ denotes a position on the reference path;
    defining an objective function J, which is a function of at least a sequence of states $x=(x_k)_{k=1}^{N}$ of the vehicle constituting the vehicle trajectory and of a width-controlling quantity $r=(r_l)_{l=1}^{M}$;
    constraining the vehicle's position inside a corridor with variable corridor width around the reference path $X^r$, wherein the corridor width is controlled by the width-controlling quantity, and wherein the objective function includes a penalty on the corridor width such that a decrease of the corridor width implies an increase of the objective function;
    generating the vehicle trajectory by maximizing the objective function subject to predefined vehicle dynamics $x_{k+1}=f(x_k, u_k)$, where $u_k$ is a control input to the vehicle, and
    delimiting the corridor laterally by associating each point $X_l^r$ of the reference path with a pair of ellipses with variable radius $(r_l)_{l=1}^{M}$, the ellipses being spaced apart in directions normal to a momentary heading of the reference path, wherein the variable radius is said quantity defining the width of the corridor, and the radius is expressed as a scalar representing a circle radius or as two components representing the minor and major axes of each ellipse; and
    requiring each vehicle position $X_k$ to be outside the ellipses.

2. The method of claim 1, further comprising enforcing a least radius $r_{min}$ of the ellipses.

3. The method of claim 1, wherein a gradient-based optimization solver is used, the method further comprising:
    initializing the vehicle trajectory such that the vehicle position $X_k$ for each state $x_k$ is inside the corridor.

4. The method of claim 1, further comprising:
    generating a sequence of control inputs $u=(u_k)_{k=1}^{N}$ to the vehicle.

5. The method of claim 4, further comprising:
    controlling the vehicle by applying the sequence of control inputs.

6. The method of claim 1, further comprising:
    generating the sequence of states $x=(x_k)_{k=1}^{N}$ by maximizing the objective function J; and
    after completion of said generating, controlling the vehicle on the basis of the sequence of states.

7. The method of claim 6, wherein the penalty on the corridor width is enforced collectively for the full corridor.

8. The method of claim 1, which is performed offline.

9. The method of claim 1, wherein the objective function J is a function of the sequence of states x and the sequence of control inputs u.

10. The method of claim 9, wherein the objective function J is dependent on one or more of: mission duration, a safety indicator, trajectory smoothness, position trajectory smoothness, deviation from the reference path $X^r$, steering angle rate, lateral or longitudinal jerk, lateral or longitudinal acceleration.

11. The method of claim 1, wherein the vehicle dynamics $f$ and/or the objective function J depends on at least one environmental factor.

12. The method of claim 1, wherein the vehicle dynamics is non-holonomic.

13. The method of claim 1, wherein the reference path $X^r$ has a discrete-time representation and the optimization is configured to provide the sequence of states independently of said discrete-time representation.

14. The method of claim 1, further comprising one of:
    recording the reference path $X^r$ by sensing positions of an operating vehicle;
    defining the reference path $X^r$ using an operator interface.

15. The method of claim 1, wherein the vehicle is a vehicle combination.

16. A device for generating a vehicle trajectory, which comprises a sequence of states $x=(x_k)_{k=1}^{N}$ of the vehicle, by optimizing the objective function J, the device comprising processing circuitry configured to execute the method of claim 1.

17. A non-transitory computer readable medium storing a computer program comprising instructions which, when executed, cause a processor to execute the method of claim 1.

\* \* \* \* \*